J. G. BEATH.
POTATO MASHER.
APPLICATION FILED JAN. 28, 1916.
1,205,966. Patented Nov. 28, 1916.
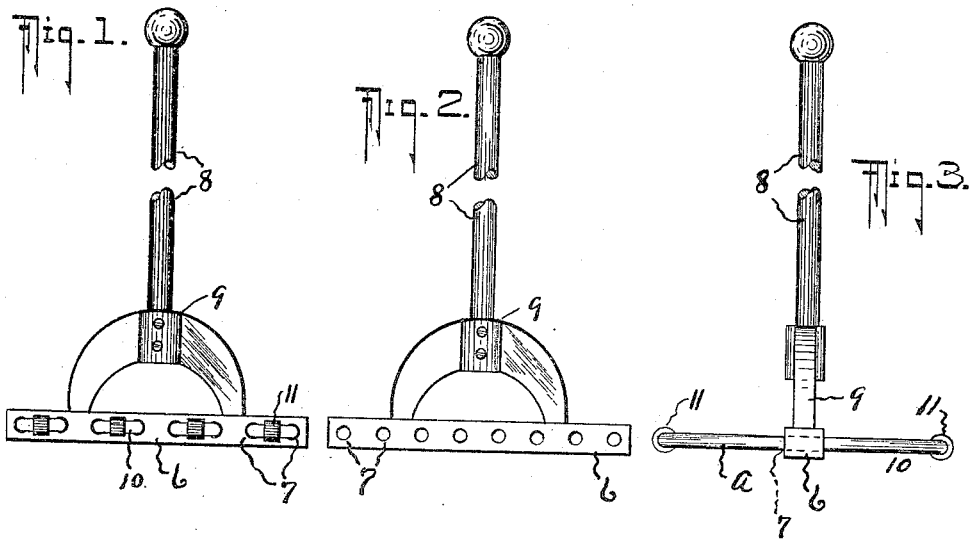
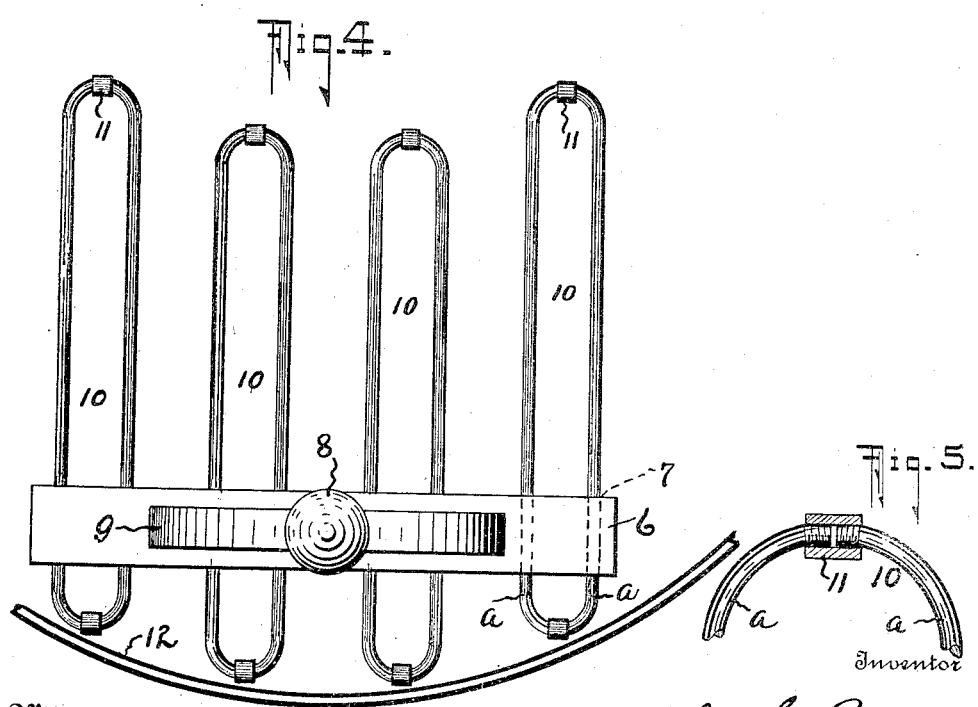

UNITED STATES PATENT OFFICE.

JOHN G. BEATH, OF GOTHENBURG, NEBRASKA.

POTATO-MASHER.

1,205,966.   Specification of Letters Patent.   Patented Nov. 28, 1916.

Application filed January 28, 1916. Serial No. 74,950.

*To all whom it may concern:*

Be it known that I, JOHN G. BEATH, a citizen of the United States, residing at Gothenburg, in the county of Dawson and State of Nebraska, have invented certain new and useful Improvements in Potato-Mashers, of which the following is a specification.

This invention relates to an improvement in potato mashers, and has for its principal object to provide an implement by means of which potatoes may be more quickly and thoroughly mashed than by means ordinarily used.

The invention also has reference to such a construction that durability may be attained and manufacture will be convenient and economical.

In the accompanying drawing forming a part of the application, Figure 1 is a view in side elevation of the device, the handle being broken away. Fig. 2 is a similar view to that shown in Fig. 1, the elongated loops for the head-piece being omitted. Fig. 3 is a view of the same taken at right angles to the view shown in Fig. 1. Fig. 4 is a plan view of the device on an enlarged scale, a part of the side of a receptacle being added. Fig. 5 is a detail to illustrate the preferred connection for the ends of the loops.

Referring now to the drawing, numeral 6 indicates an elongated head-piece provided with parallel apertures 7, these being preferably disposed side by side in a single plane and arranged in pairs, a handle 8 being provided and rigidly connected with the head-piece by any suitable means, as by use of the yoke or bracket 9.

At 10 are indicated a plurality of elongated loops, each preferably consisting of two metallic strips or rods $a$ which, as shown in Fig. 5 may be reversely treaded at their ends, and after being inserted in apertures 7, may be suitably curved near their terminals and connected by the screw-couplings 11. While the bore of apertures 7 is substantially the same as the diameter of the rods $a$, there is a sufficient difference to permit the loops to work back and forth in the apertures without appreciable friction, and in operation the loops will be maintained parallel, or substantially so, for the reason that the head-piece 6 may have an adequate width and the apertures $a$ corresponding length for that purpose.

The implement is used the same as an ordinary potato masher, the material difference being that the loops which engage the potatoes may move at right angles to the elongated head-piece. During operation, the loops may engage curved surfaces to advantage, as the curved surface 12 of a container, and the implement is particularly effective in operation when the handle is disposed inclinedly, the loops moving transversely of the head-piece either by gravity or when engaged by the curved side of the container, the result being that the potatoes or other vegetables therein may be quickly and completely mashed.

Having described the several parts of the implement and their uses, a further explanation relating to operation is not necessary. While I have shown loops, each consisting of two parts, and have shown a head-piece consisting of an integral part or casting, I do not wish to be understood as limiting myself to this construction, nor to form, size or proportion or any particular material to be employed, but prefer to limit myself only to the construction pointed out by the appended claims, since the scope of the invention is determined thereby.

I claim,—

1. A potato masher consisting of an elongated, rectilinear head-piece provided with transverse apertures, a handle for said head-piece, and a plurality of elongated loops adapted to have slidable movements independent of each other while disposed in the apertures of the head-piece.

2. In a potato masher, a head-piece provided with a handle and formed with substantially parallel apertures arranged in pairs, and a plurality of elongated loops, each being loosely seated in a pair of apertures to permit slidable movements therein.

3. A potato masher consisting of an elongated head-piece provided with a handle and a plurality of elongated loops adapted to have movements transversely of the head-piece while supported thereby.

In testimony whereof, I have affixed my signature in presence of two witnesses.

JOHN G. BEATH.

Witnesses:
ARTHUR GENTZLER,
H. C. LOUTZENHEISER.

Copies of this patent may be obtained for five cents each, by addressing the "Commissioner of Patents, Washington, D. C."